United States Patent [19]
Leist

[11] Patent Number: 6,131,461
[45] Date of Patent: Oct. 17, 2000

[54] FLEXURE ASSEMBLY

[75] Inventor: Theodore Leist, Middletown, Ohio

[73] Assignee: MB Dynamics, Cleveland, Ohio

[21] Appl. No.: 09/377,122

[22] Filed: Aug. 19, 1999

Related U.S. Application Data

[60] Provisional application No. 60/098,746, Sep. 1, 1998.

[51] Int. Cl.[7] .................................................. G01M 7/00
[52] U.S. Cl. .............................................................. 73/662
[58] Field of Search ....................................... 73/662, 570

[56] References Cited

U.S. PATENT DOCUMENTS

| | | |
|---|---|---|
| 3,106,653 | 10/1963 | Fowler . |
| 3,123,728 | 3/1964 | Kreiskorte . |
| 3,167,670 | 1/1965 | Spurlin . |
| 3,326,038 | 6/1967 | Schloss . |
| 4,499,772 | 2/1985 | Haas . |
| 4,715,229 | 12/1987 | Butts . |
| 4,858,488 | 8/1989 | Butts . |
| 4,977,342 | 12/1990 | Adams . |
| 5,351,545 | 10/1994 | Lucas . |

OTHER PUBLICATIONS

Ling Electronics Brochure—No Date.

*Primary Examiner*—Richard A. Moller
*Attorney, Agent, or Firm*—Carlson, Gaskey & Olds

[57] ABSTRACT

A flexure assembly that is particularly useful in vibration testing equipment provides a noiseless, frictionless support that allows motion in a desired direction while restricting motion in other directions. The flexure assembly includes a flexure arm that is made from a material that is at least partially flexible in one direction while being stiff in at least two other directions, which are generally perpendicular to the one direction. A first end of the flexure arm is adapted to be rigidly secured to a moving portion in a vibration testing device, for example. A second end of the flexure arm is rigidly secured to a mounting block. The mounting block is also rigidly secured to two flexure leaves, which are also made from a material that is at least partially flexible in one direction while being stiff in at least two other, generally perpendicular, directions. A second end of the flexure leaves are rigidly secured to a second mounting block, which is adapted to be secured to a base within a vibration testing device, for example. The flexure arm and flexure leaves preferably are made from stainless steel and are generally planar and generally rectangular.

24 Claims, 10 Drawing Sheets

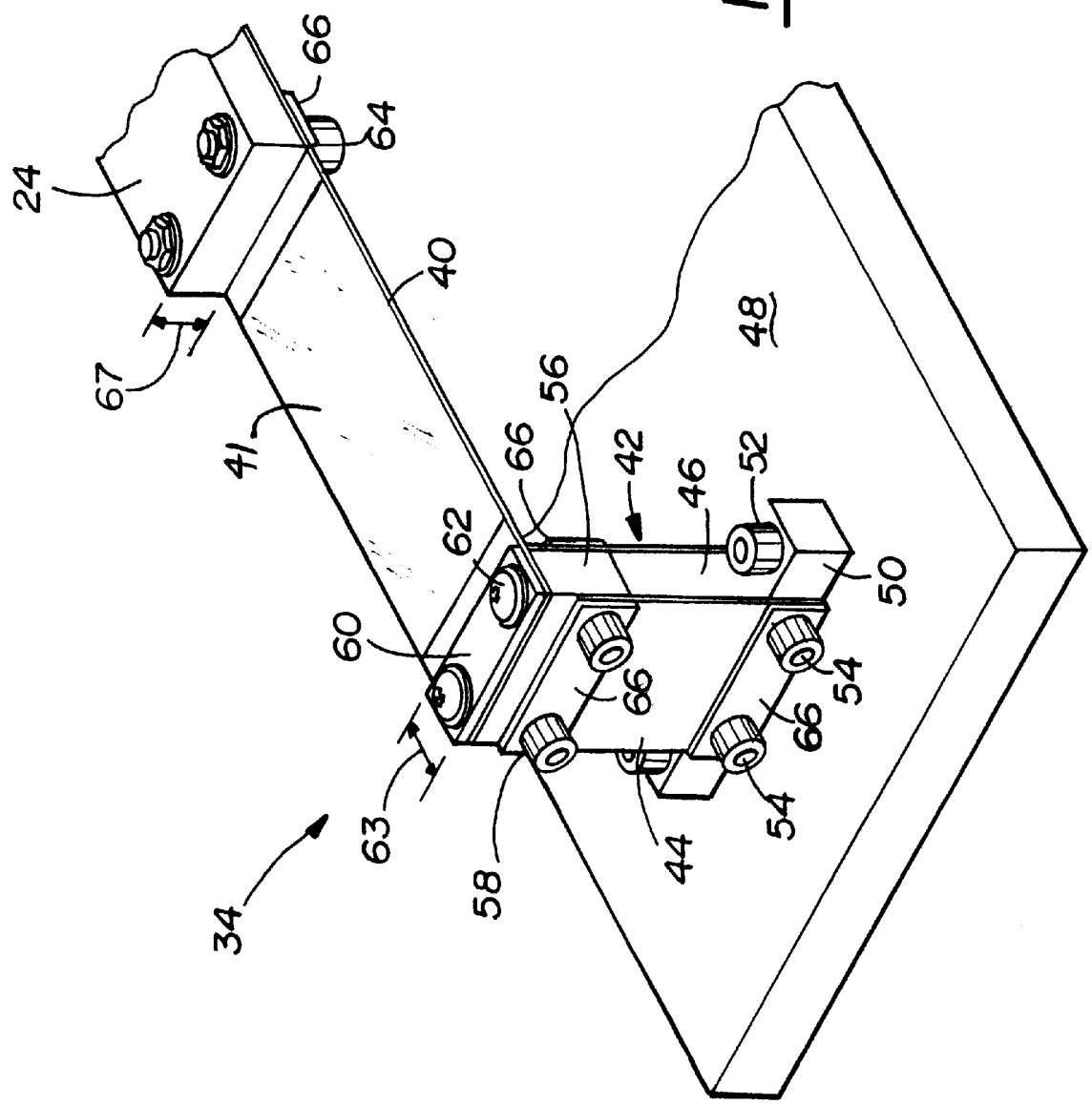

FLEXURE ASSEMBLY

This application claims the benefit of U.S. provisional No. 60/098,746 Sep. 1, 1998.

BACKGROUND OF THE INVENTION

This invention generally relates to a flexure assembly that is useful for guiding reciprocating elements in a desired linear motion such as an armature within vibration test equipment.

A variety of vibration test devices are commercially available and commonly referred to as shakers or exciters or vibration generators. There are several basic components within most such devices including an armature suspended for movement relative to a stator. A coil is typically carried by the armature and located in an air gap between the armature and the stator. Permanent magnets or electromagnets are typically used to generate a D.C. magnetic field across the air gap. By feeding an alternating current through the coil, the armature is caused to reciprocate or vibrate along its longitudinal axis relative to the stator at the frequency of the applied alternating current.

Since the armature must move relative to the stator, it is typically mounted with a series of bearings and/or a plurality of peripheral suspension members. The bearings and suspension members serve the functions of centering the armature and allowing it to move along its longitudinal axis. Preferably, the armature is prevented from any lateral movement normal to the longitudinal axis along which the armature moves during vibration. A variety of bearings and suspension members have been proposed in the past, however, none have proven satisfactory for all conditions and circumstances. Typical problems with existing arrangements include distortion of the purity of the vibration motion caused by typical suspension members. Additionally, conventional arrangements typically do not adequately restrict off-axis movement and do not provide the degree of accuracy that is needed in many situations. Moreover, none of the prior systems adequately address all of these issues.

An additional problem presented by conventional bearings and suspension members is that they typically introduce noise during the vibration movement. Any additional noise is undesirable under circumstances where the purpose of the vibratory test is to determine squeaks and rattles within an item that is being tested. One example includes instrument panels that are included in passenger vehicles. During a testing operation, the ability to detect squeaks and rattles within an assembled instrument panel is compromised by extraneous noises that are created by the bearings or suspension members within the testing device.

Therefore, there is a need for an improved assembly that will allow for an armature within a vibration testing device to move along its longitudinal axis while also preventing any cross-axis motion and doing so with minimal noise. This invention addresses those needs and overcomes the shortcomings and drawbacks of the prior art described above.

SUMMARY OF THE INVENTION

In general terms, this invention is a flexure assembly that is useful for supporting and guiding a vibrating member or a structure that moves reciprocally along a vibration axis. A flexure assembly designed according to this invention includes several basic components. A flexure arm includes two longitudinal ends. One end is rigidly connected to the moving member. The other end is rigidly connected to a supporting subassembly that includes several components. The supporting subassembly has two flexure leaves that preferably are planar and aligned parallel to each other. The leaves are spaced apart and secured to a first mounting block at one end and a second mounting block at the other end. The first mounting block also provides a connection point for connecting the second end of the flexure arm to the support subassembly. The second mounting block facilitates connecting the support subassembly to a stable base that remains in a fixed position even while the moving member moves reciprocally along the vibration axis.

The flexure arm and flexure leaves preferably are made from a stiff, metallic material. In the most preferred embodiment stainless steel is used. The material of the flexure arm and the flexure leaves and the arrangement of the components of the flexure assembly provides a supporting member for an armature within a vibration test device that allows the armature to move reciprocally along a vibration axis. By utilizing a plurality of flexure assemblies designed according to this invention in a suitable arrangement, the armature is prevented from moving in any direction other than along the vibration axis. Accordingly, a flexure assembly designed according to this invention provides a stable, noiseless and frictionless support structure for a reciprocating member within a vibration test device.

The various features and advantages of this invention will become apparent to those skilled in the art from the following detailed description of the preferred embodiments. The drawings that accompany the detailed description can be briefly described as follows.

BRIEF DESCRIPTION OF THE DRAWINGS

FIG. 3 is a perspective illustration of a preferred embodiment of a flexure assembly designed according to this invention.

DETAILED DESCRIPTION OF THE PREFERRED EMBODIMENT

Figure 1:
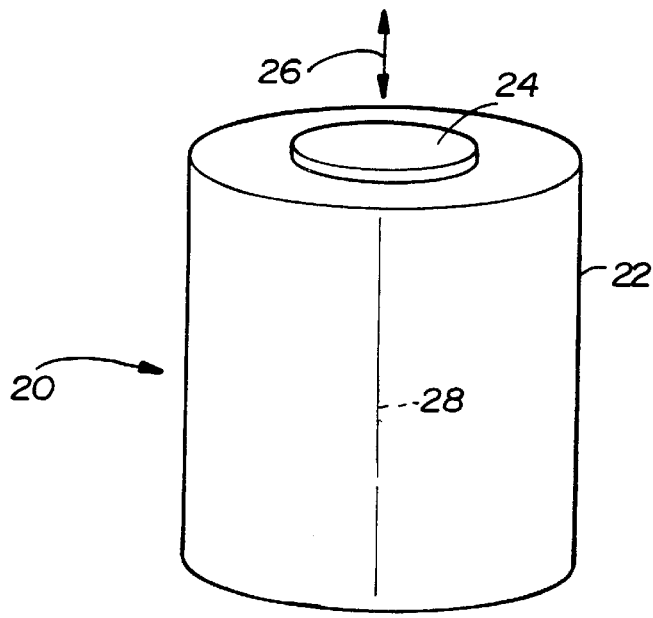
FIG. 1 is a perspective, diagrammatic illustration of a vibration test device.

FIG. 1 diagrammatically illustrates a vibration test device 20. A generally cylindrical housing 22 supports a plurality of components that allows a moving member 24 to move reciprocally as indicated by the arrows 26 along a vibration axis 28.

Figure 2:
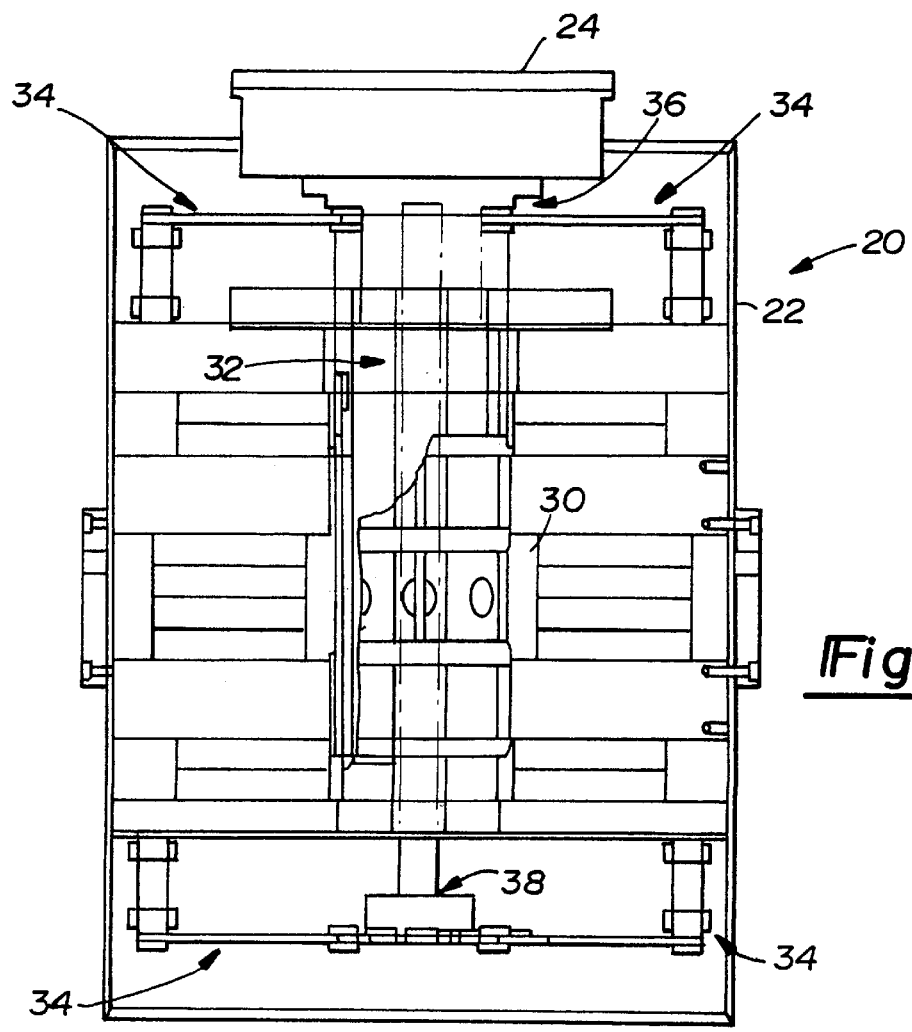
FIG. 2 is a partially cross-sectional view of the embodiment of FIG. 1.

FIG. 2 diagrammatically illustrates some of the internal components of the device 20. A stator 30 is rigidly supported within the housing 22 so that it remains stationary with the housing. An armature 32 is supported by a plurality of flexure assemblies 34 so that the armature 32 can move along the vibration axis 28 responsive to an alternating current being applied to a coil (not specifically illustrated) associated with the armature 32. As the armature 32 moves back and forth along the vibration axis 28, the moving member 24 moves relative to the housing 22. In some embodiments the moving member 24 and the armature 32 are integrally formed as a single piece. In other examples, the moving member 24 and the armature 32 are separate pieces that are rigidly attached together so that they move in unison. By supporting a device on the moving member 24, the desired vibration test can be carried out in a generally conventional manner.

The flexure assemblies 34 preferably support a first end 36 and a second end 38 of the armature 32. The flexure assemblies 34 permit the armature 32, and the moving member 24, to move back and forth along the vibration axis 28. The flexure assemblies 34 also provide lateral stiffness and do not allow the armature 32 to move in any direction normal to the vibration axis 28. Moreover, the flexure assemblies 34 provide a frictionless and noiseless support for the armature 32, which is extremely advantageous in a wide variety of applications.

Although the illustrated embodiment shows flexure assemblies at each end of the armature, there may be situations where a flexure assembly at only one end is sufficient. The minimum requirements in many situations is that the moving member 24 and the test item supported by it do not experience any off-axis motion during a vibration test procedure.

FIG. 3 shows the flexure assembly 34 in greater detail. A flexure arm 40 preferably is generally planar, rectangular, thin and made from a stiff material. Most preferably, stainless steel is used, but other materials may be used. A first end of the flexure arm 40 is rigidly connected to the moving member 24. The opposite end of the flexure arm 40 is connected to a support subassembly 42. The illustrated example has one piece of material as the flexure arm 40, but this invention includes arrangements with flexure arms that are made from two or more layers of material.

It is most preferred to include dampers 41 on the flexure arms 40. The dampers 41 reduce resonant response that otherwise would have a tendency to generate noise at some frequencies. It is currently preferred to adhesively secure a layer of elastomeric material to the large surface area of the flexure arms 40. In the currently preferred embodiment, damping pads available from Tech Products in Dayton, Ohio are used for the dampers 41. For simplicity, the dampers 41 are not specifically illustrated in the remaining drawings, although they may be used in any illustrated example as needed.

First and second flexure leaves 44 and 46 preferably are also rectangular, relatively thin and made from a rigid material. One end of the flexure leaves 44 and 46 is supported against a rigid base 48 by a mounting block 50. The mounting block 50 also serves to space the flexure leaves 44 and 46 apart by a desired distance, which is equal to the thickness of the mounting block 50. A set of conventional fasteners 52, such as screws, secure the mounting block 50 to the base 48. In most embodiments, the base 48 is a member that is rigidly supported within the housing 22 of a vibration testing device, for example. The form of the base 48 is not important, only that it stay stationary relative to the moving member 24 as necessary. An additional set of fasteners 54, such as nuts and bolts are used to secure the first end of the flexure leaves 44 and 46 to the mounting block 50.

A second mounting block 56 is provided at the second end of the flexure leaves 44 and 46. A set of conventional nuts and bolts 58 secure the flexure leaves to the mounting block 56. The combination of the mounting blocks 50 and 56 and the flexure leaves 44 and 46 make up the essential components of the support subassembly 42. The illustrated example includes only one leaf 44 and one leaf 46, but it is within the scope of this invention to utilize more than one flexure leaf at each side of the subassembly 42 so that there are more than two flexure leaves in the support subassembly.

A flexure clamp block 60 preferably is provided at the second end of the flexure arm 40, which is rigidly secured to the mounting block 56. The flexure clamp block 60 preferably is placed between the upper (according to the drawing) surface of the flexure arm 40 and fastening elements 62, which are used to secure the flexure arm 40 the mounting block 56. The fastening element 62 can be conventional screws, for example. Accordingly, the flexure clamp block serves to prevent deformation to the flexure arm 40 where the fastening elements 62 secure the flexure arm 40 to the mounting block 56. Moreover, the combination of the mounting block 56 and the flexure clamp block 60 maintain at least a portion of the length of the flexure arm 40 in a desired orientation at all times. The section of the flexure arm 40 indicated at 63 remains parallel to the base 48 at all times as will be described below.

The opposite end of the flexure arm 40 is secured to the moving member 24 using conventional fasteners 64 such as nuts and bolts. A clamp block 66 preferably is placed on the opposite face of the flexure arm 40 from the moving member 24. The clamp block 66 provides that a portion of the length of the flexure arm 40 indicated at 67 does not flex during movement of the moving member 24. At least the portions of the flexure arm 40 indicated at 63 and 67 remain parallel to the base 48 at all times.

Similar clamp blocks 66 preferably are placed on the flexure leaves 44 and 46 at the points where the flexure leaves are connected to the mounting blocks 50 and 56, respectively. The clamp blocks 66 used on the flexure leaves 44 and 46 provide the same functions as the clamp blocks 60 and 66 used with the flexure arm 40. Depending on the location of each clamp block, the dimensions can be varied so that different thicknesses or surface areas are used.

Figure 4A:
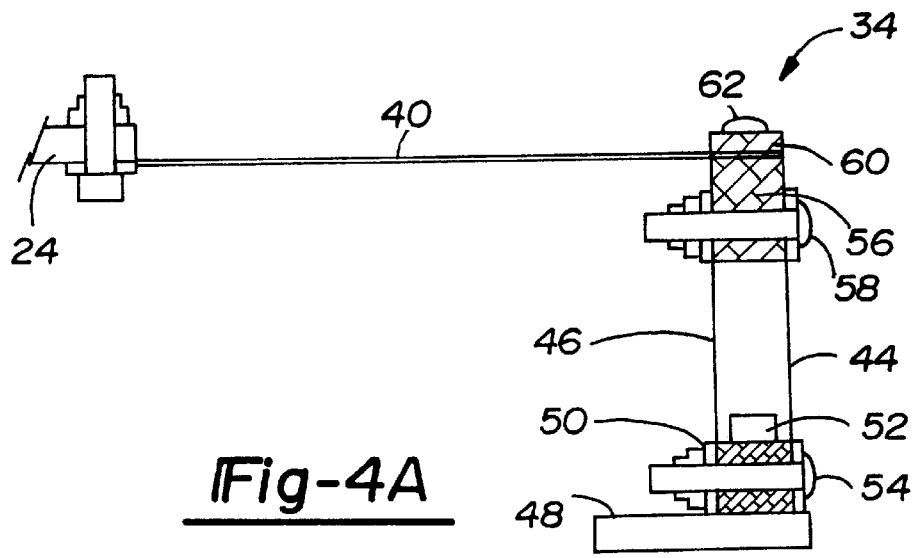
FIGS. 4A and 4B are side, partially cross-sectional illustrations of the embodiment of FIG. 3.
Figure 4B:
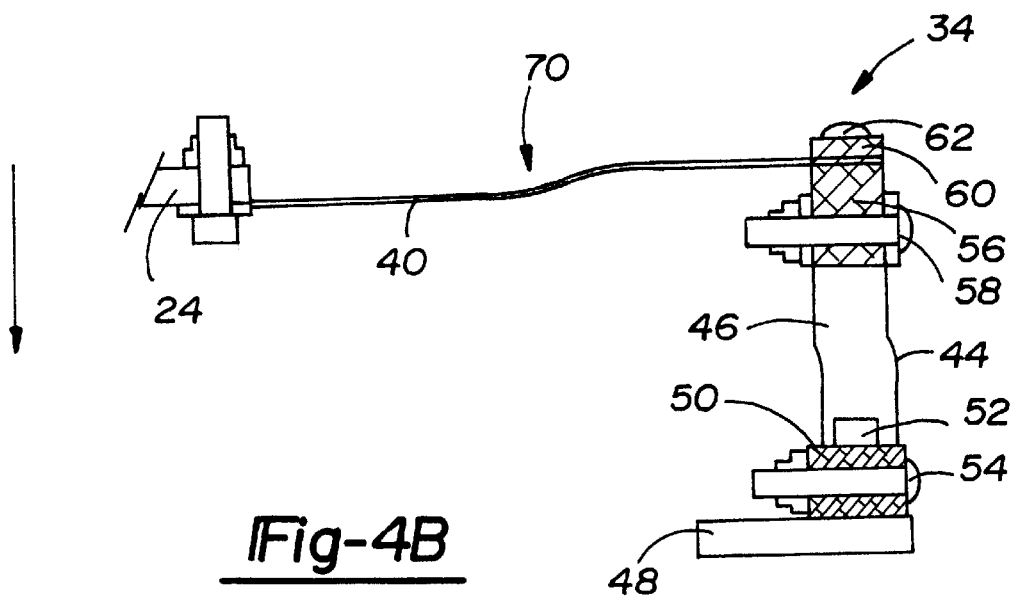

Referring to FIGS. 4A and 4B the movement of the flexure assembly is schematically illustrated. FIG. 4A shows the moving member 24 in a first position. FIG. 4B illustrates the moving member 24 having moved downward (according to the drawings) from the position in FIG. 4A. As can be appreciated from FIG. 4B, the flexure arm 40 bends in the direction of the longitudinal vibration axis 28. A generally "S" shaped configuration 70 is imposed on the flexure arm 40. The portions 63 and 67 of the flexure arm 40 remain parallel to the base 48 and only the central portion of the flexure arm bends during movement of the moving member 24. At the same time, the flexure leaves 44 and 46 bend in a similar fashion. The amount of bending of the flexure arm 40 and the flexure leaves 44 and 46 is exaggerated in FIG. 4B for illustration purposes only. As can be appreciated from FIGS. 4A and 4B any movement of the first end of the arm 40, which is connected to the moving member 24, and the end of the flexure leaves 44 and 46 which are secured to the mounting block 56, is such that the orientation of the ends of the flexure arm 40 and the ends of the flexure leaves 44 and 46 do not rotate relative to the plane that each is in while the flexure assembly 34 is in a rest position.

Figure 5:
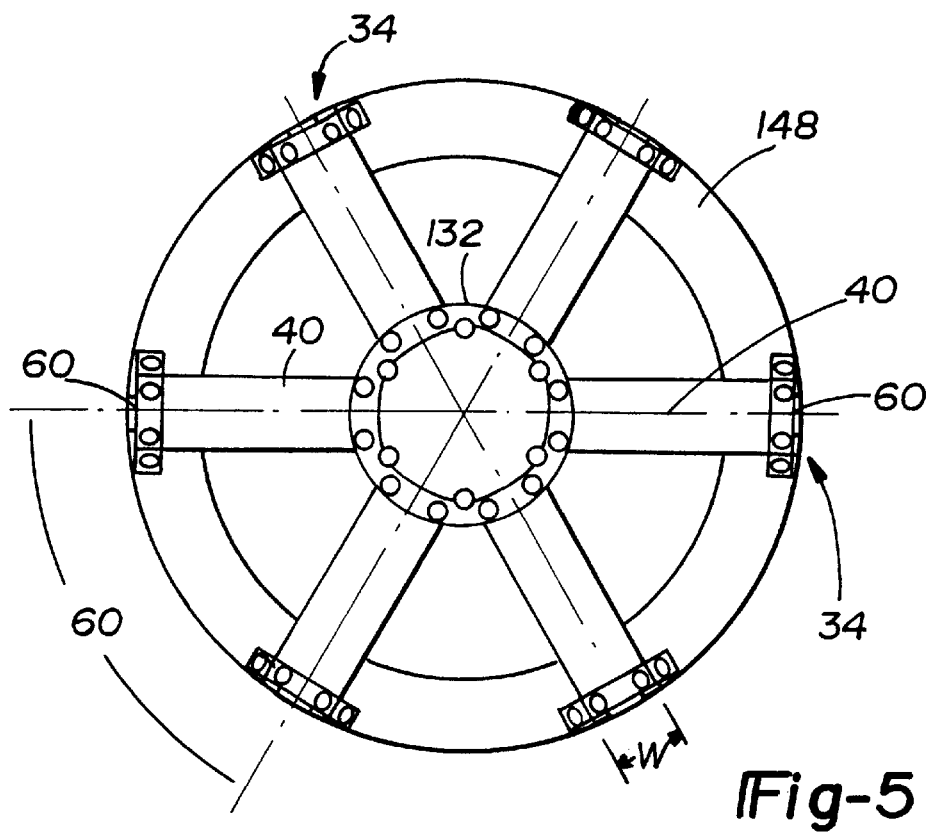
FIG. 5 is a diagrammatic illustration of an arrangement of a plurality of flexure assemblies as illustrated in FIG. 3.

A plurality of flexure assemblies can be used in a variety of orientations to allow a moving member such as the armature 32 to move along a vibration axis while preventing any lateral or torsional movement relative to the vibration axis. FIG. 5 illustrates one arrangement of a plurality of flexure assemblies 34 about a reciprocating member 132. The base 148 is a generally circular member that would be supported within a housing 22 of a vibration test device, for example. The arrangement of six flexure assemblies 34 spaced apart by approximately sixty degrees provides for a very stable arrangement. Different numbers of assemblies 34 and different spacing or arrangements also may be used, as desired. Those skilled in the art will be able to choose the ideal arrangement to suit the needs of a particular situation.

There are limitations to an embodiment like that shown in FIG. 5, however. For example, the width of the flexure arms 40, which is measured as shown by w in FIG. 5, is limited by the size of the available connecting surface on the armature 132. Since some applications require more lateral stiffness than others, it is desirable to use flexure arms 40 having greater widths under such circumstances.

Figure 6:
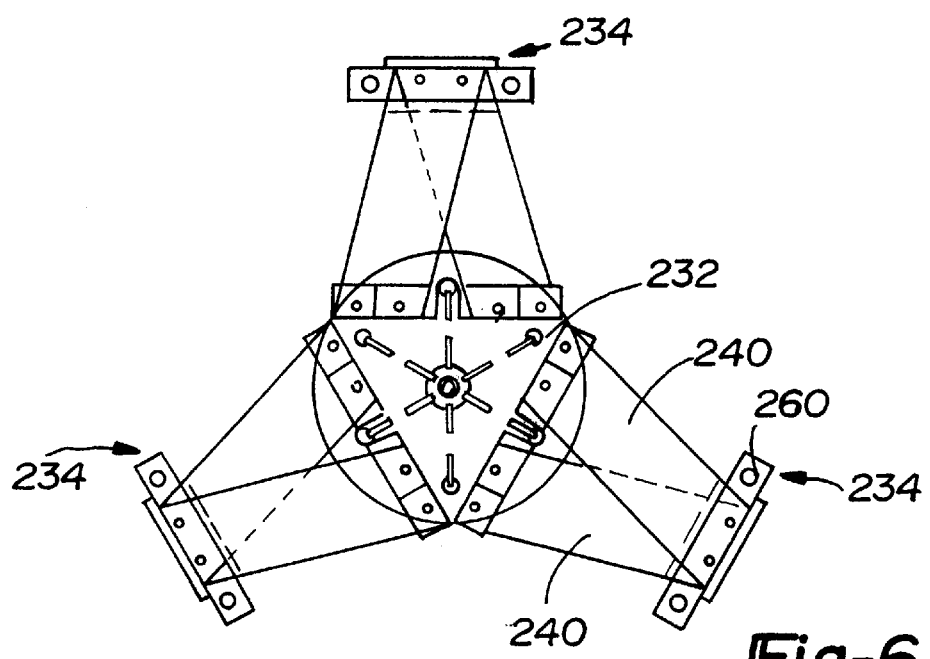
FIG. 6 is a diagrammatic illustration of an arrangement of flexure assemblies having further advantages compared to the arrangement of FIG. 5.

The embodiment of FIG. 6 shows the most preferred arrangement of flexure assemblies 234 when a generally circular connecting surface is provided on an armature 232. The arrangement illustrated in FIG. 6 greatly increases the edge bending stiffness of the flexure assembly 234. By using six flexure arms 240 in the arrangement illustrated in FIG. 6, the same cross-axis stiffness is provided that otherwise would only be achievable by using stacks of at least two and possibly including more than four flexure arms 40, which would require substantially more material and parts than the arrangement of the embodiment of FIG. 6. The flexure assemblies 234 are illustrated in more detail in FIG. 7.

The flexure assemblies 234 each include two or more flexure arms 240 having one end supported against the mounting block 256. The clamping block 260 and an additional spacer, clamping block 272 is provided to secure the ends of the flexure arms 240 and to keep them spaced apart a desired distance. Flexure leaves 244 and 246 operate in the same general manner as the flexure leaves 44 and 46 described above. The same is true of the mounting block 250 and the remaining components illustrated in FIG. 7, which have numbers similar to those used in FIG. 3 but increased by 200.

Figure 7:
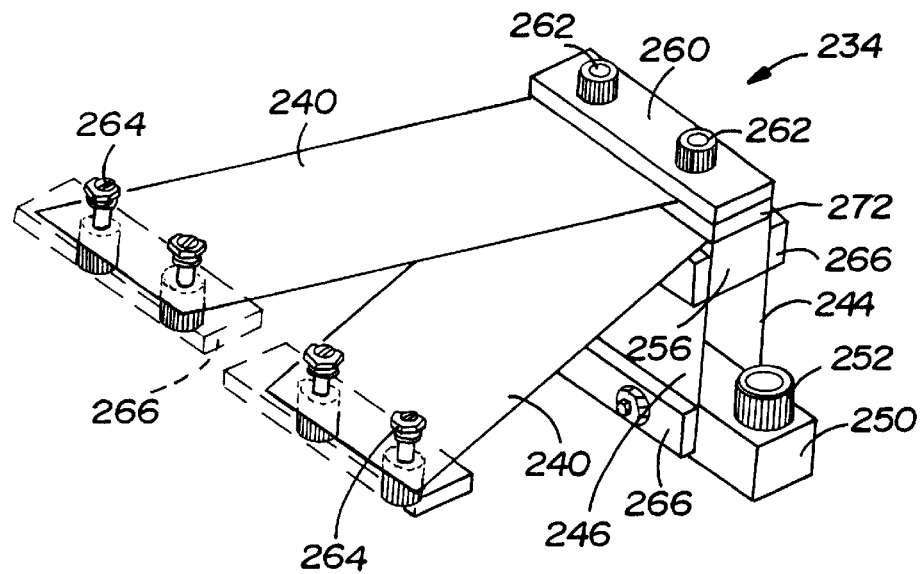
FIG. 7 is a perspective illustration of the flexure assemblies used in the embodiment of FIG. 6.

The arrangement of FIGS. 6 and 7 provides significant advantages in achieving greater off-axis stiffness. Achieving greater stiffness can be accomplished in any one of the illustrated embodiments by increasing the width of the flexure arm, increasing the thickness of the flexure arm or stacking multiple flexure arms on top of one another. Additionally, the width or thickness of the flexure leaves may be increased to achieve the same results. Stacking multiple flexure leaves together also provides increased thickness. Of course, a combination of two or more such modifications can be used effectively. While each of these options may be workable in some circumstances, they are not without limitations and drawbacks.

For example, the width of the flexure arm can only be increased as much as there is accommodating support surface on the connecting portion of the armature, for example. Increasing the thickness of a flexure arm is not always desirable because greater thickness disproportionally increases the stiffness of the flexure assembly in the desired direction of motion. For example, increasing the width of a flexure arm gives an additional stiffness that is approximately proportional to the increase in the width. Increasing the thickness, however, increases the stiffness in the axial direction approximately proportional to the product of the thickness times itself three times (i.e., thickness$^3$). In many circumstances, increasing the stiffness in the axial direction by a significant amount will detract from the ability of the vibration device 20 to operate as desired. Accordingly, using the arrangement as illustrated in FIG. 7, for example, minimizes the amount of material needed and provides the greatest off-axis stiffness while still allowing for a desired amount of stiffness in the axial direction.

In applications where a circular arrangement of flexure assemblies is necessary, a minimum of three flexure assemblies 34 preferably are utilized to achieve the desired amount of stiffness in directions other than the axial direction of movement. In embodiments having a rectangular armature or moving member at least four flexure assemblies are provided. Providing four flexure assemblies at each end of the armature is best although less than four may be provided at one end with four being provided at an opposite end depending of the needs of a particular situation.

Figure 8:
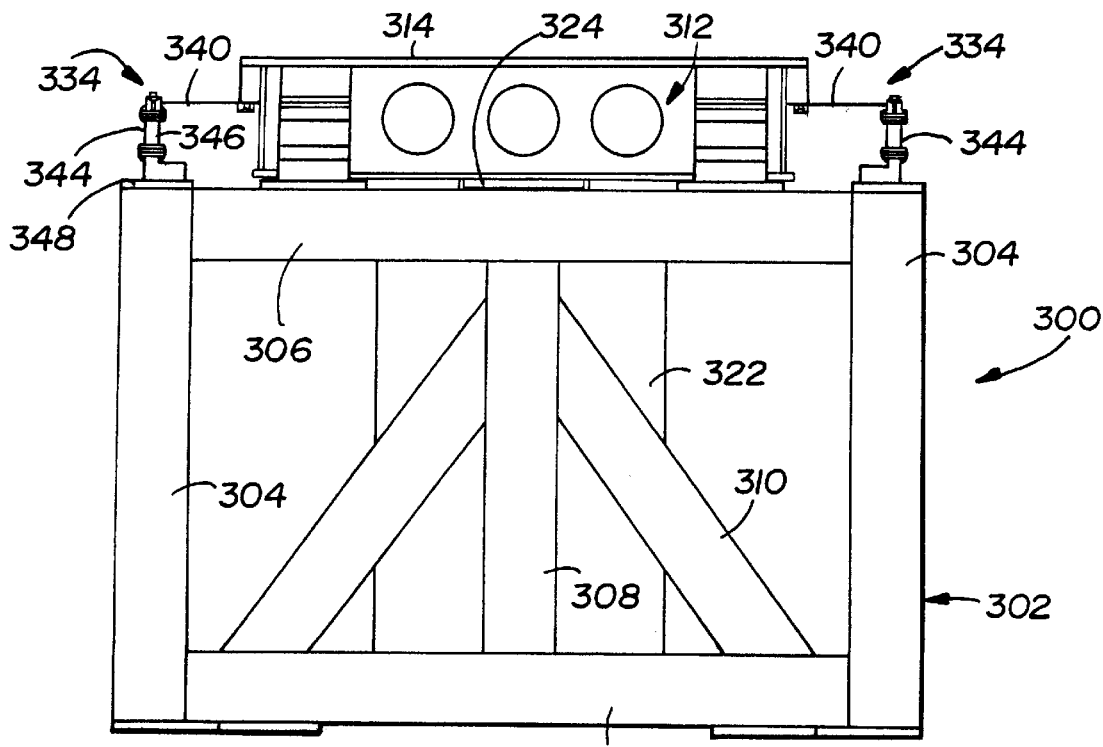
FIG. 8 is a side elevational view of a vibration test device.
Figure 9:
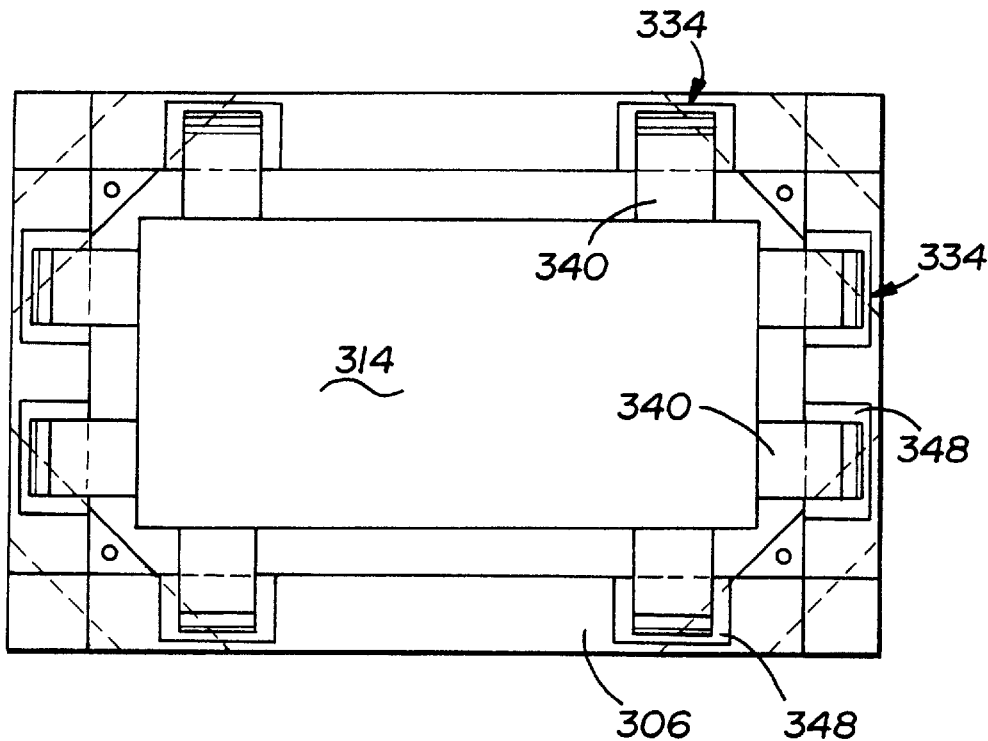
FIG. 9 is a top elevational view of the embodiment of FIG. 8.

FIG. 8 illustrates a small head expander assembly 300 including a supporting frame 302 that is made up of a plurality of vertical supports 304 and horizontal supports 306. Internal vertical supports 308 and angled struts or beams 310 are also provided to create a stiff support structure 302 as is known in the art. A shaker device is supported within the structure 302 in a conventional manner. The connection of the head expander table 312 and the moving member 324 provides a surface 314 for supporting a device to be vibrated and tested. A plurality of flexure assemblies 334 are secured to the table 312 as illustrated in FIGS. 8 and 9. The flexure assemblies 334 are illustrated in more detail in FIG. 10.

Figure 10:
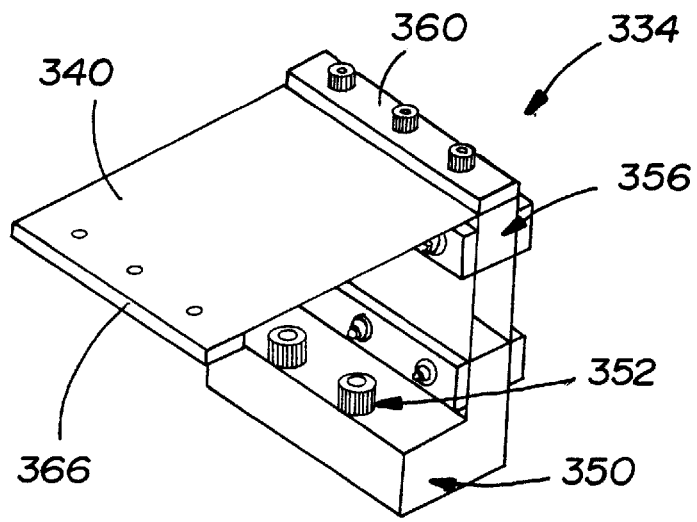
FIG. 10 is a diagrammatic, perspective illustration of a flexure assembly used in the embodiment of FIGS. 8 and 9.

The flexure assembly 334 includes basically the same components of the embodiment of FIG. 3. The differences between the assembly 334 and that described above is that the flexure arm 340 has a slightly different configuration. The difference between the length and width of the flexure arm 340 is not as great in the embodiment of FIG. 10 compared to the embodiment of FIG. 3. Additionally, the mounting block 350 has a generally L-shaped cross-section compared to the simple rectangular arrangement used in the embodiment of FIG. 3. Otherwise, the flexure assembly 334 operates in a manner like that described above.

By providing eight flexure assemblies 334, a stable arrangement is provided that allows the supporting surface 314 to move along the vibration axis without any off-axis motion.

Figure 11:
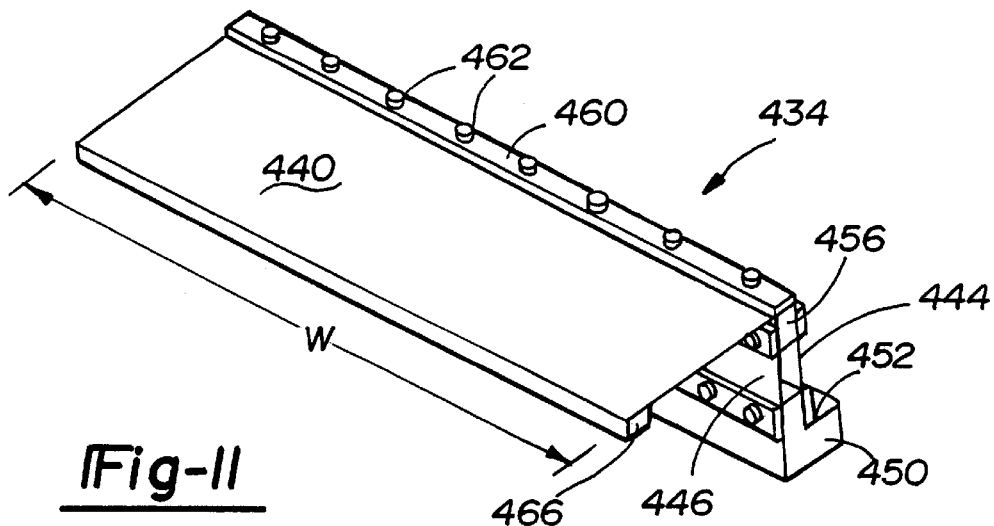
FIG. 11 is a perspective, diagrammatic illustration of another embodiment of a flexure assembly designed according to this invention.
Figure 12:
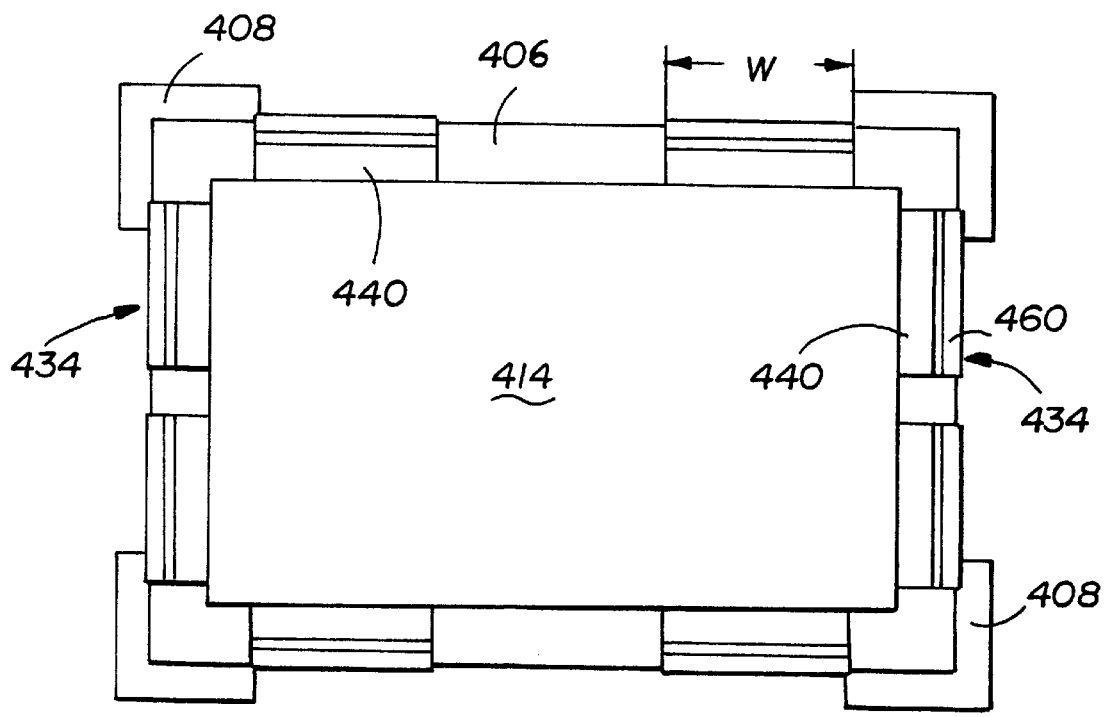
FIG. 12 is a top elevational view of another vibration test device.
Figure 13:
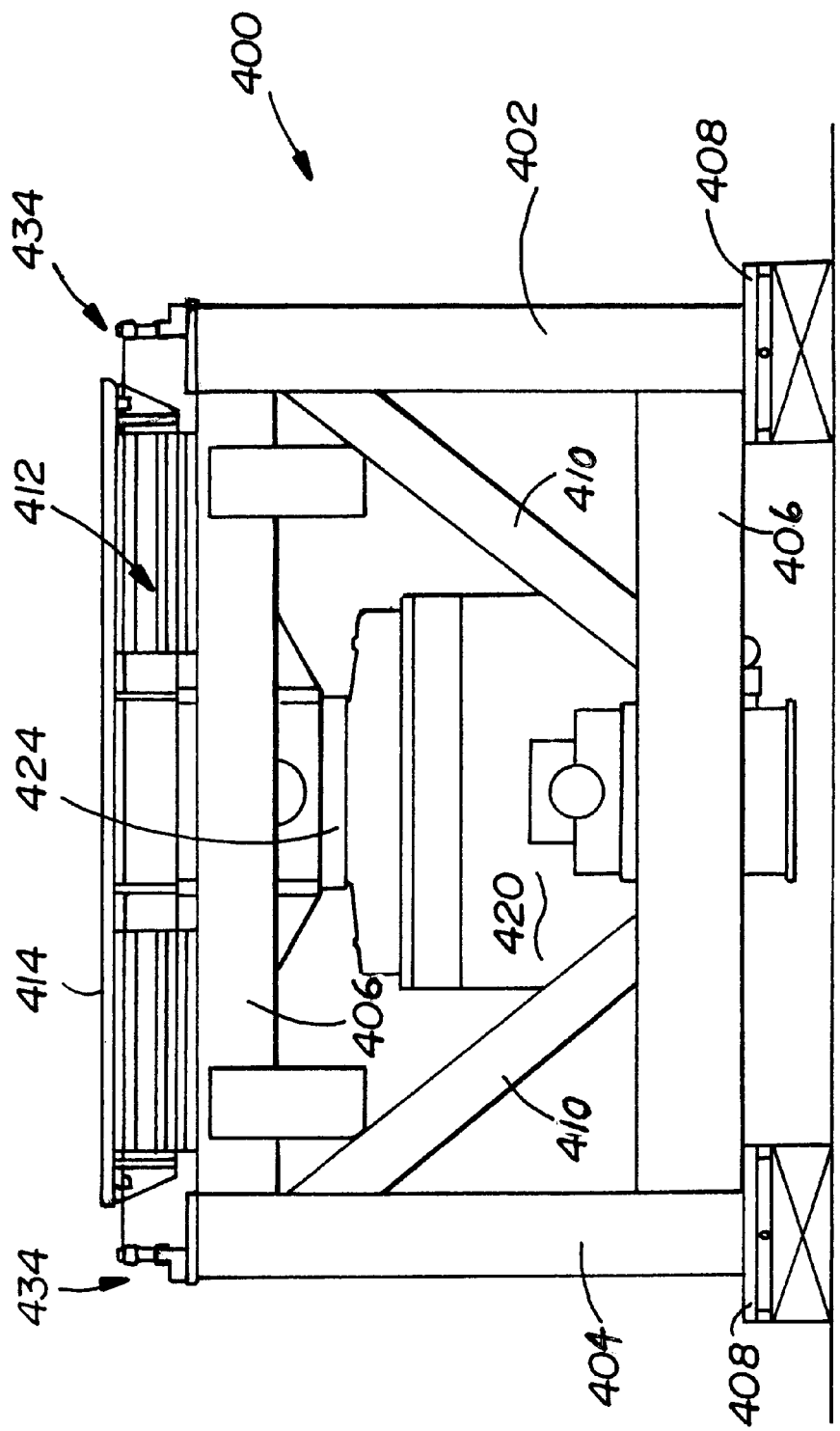
FIG. 13 is a side elevational view of the embodiment of FIG. 12.

FIGS. 11 through 13 illustrate another embodiment of a head expander that is much larger than that of FIGS. 8 and 9. As shown in FIG. 11, the width w of the flexure arm 440 is substantially greater than its length. This embodiment may be used in vibration generators or shakers that generate as little as 25 force pounds or as much as 50,000 force pounds, for example. The supporting surface 414 in one example measures 36" by 60". In this example, the flexure arms 440 preferably are 16" wide. Since the flexure arms 440 are much wider, a larger plurality of connecting elements 462, are used to secure the flexure arm 440 to the moving table 412 and the mounting blocks 450. These dimensions are but one set of an infinite number of possibilities for this type of embodiment.

Figure 14:
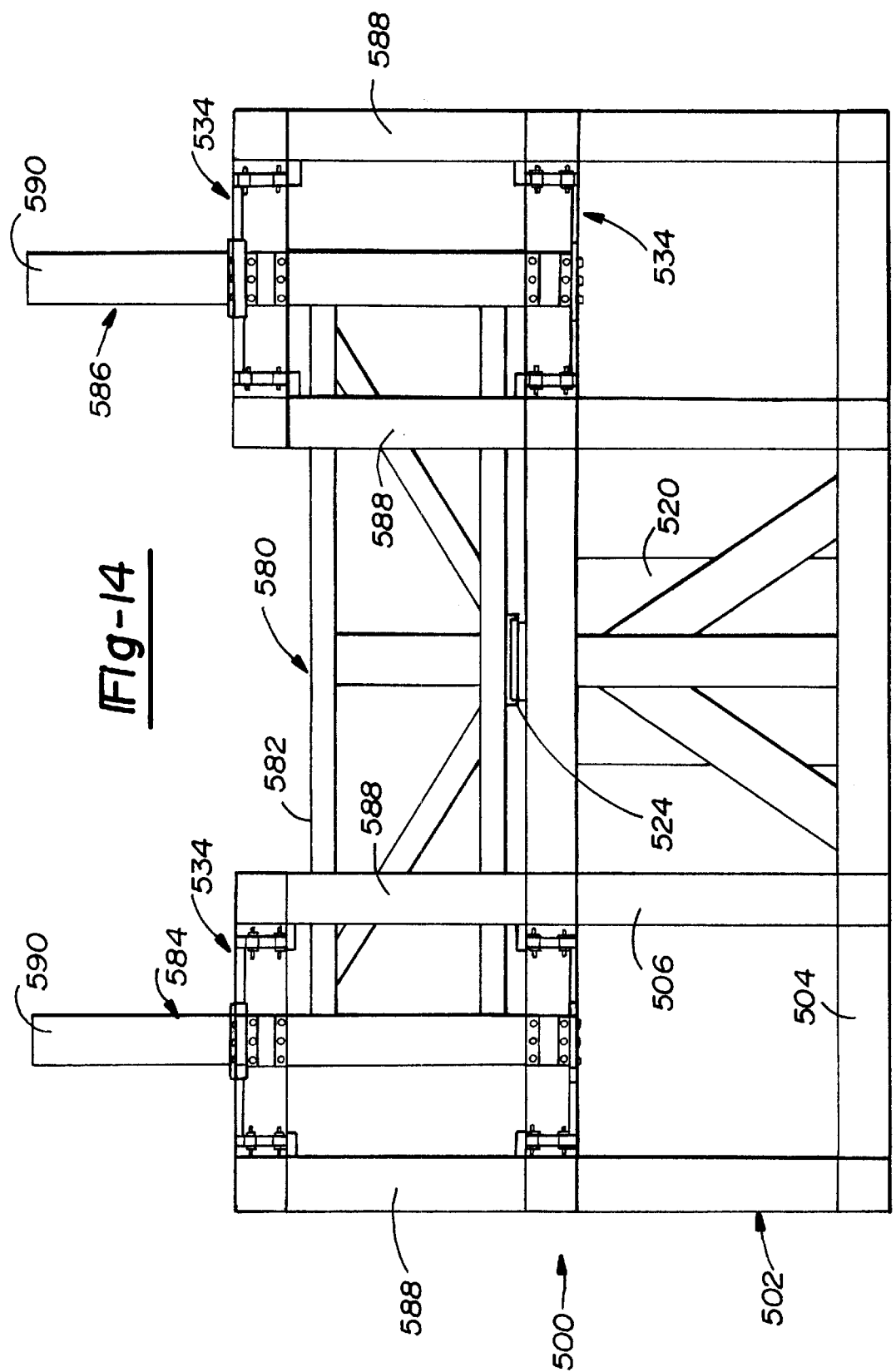
FIG. 14 is a side elevational, diagrammatic illustration of another vibration test device utilizing flexure assemblies designed according to this invention.

FIG. 14 illustrates another vibration test fixture 500. This embodiment includes a base structure made up of vertical components 502 and horizontal support beams 504. The moving structure 580 includes three surfaces 582, 584 and 586 upon which a device to be tested can be supported. The moving structure 580 is supported on the base structure through vertical posts 588 that are supported on the base structure elements 502 and 504. A plurality of flexure assemblies 534 support posts 590 for movement relative to the supports 588. In this embodiment, the shaker device 520 causes movement of the moving member 524, which in turn causes the structure 580 to vibrate about a vibration axis.

Each of the posts 590 preferably is supported by eight flexure assemblies 534. In the illustrated embodiment, the posts 590 are rectangular and four flexure assemblies 534 are provided at the bottom end (according to the drawing) and approximately midway along the length of each post, respectively. The eight flexure assemblies 534 on each post provide a stable arrangement for each post 590 even when high magnitudes of force are applied.

Figure 15:
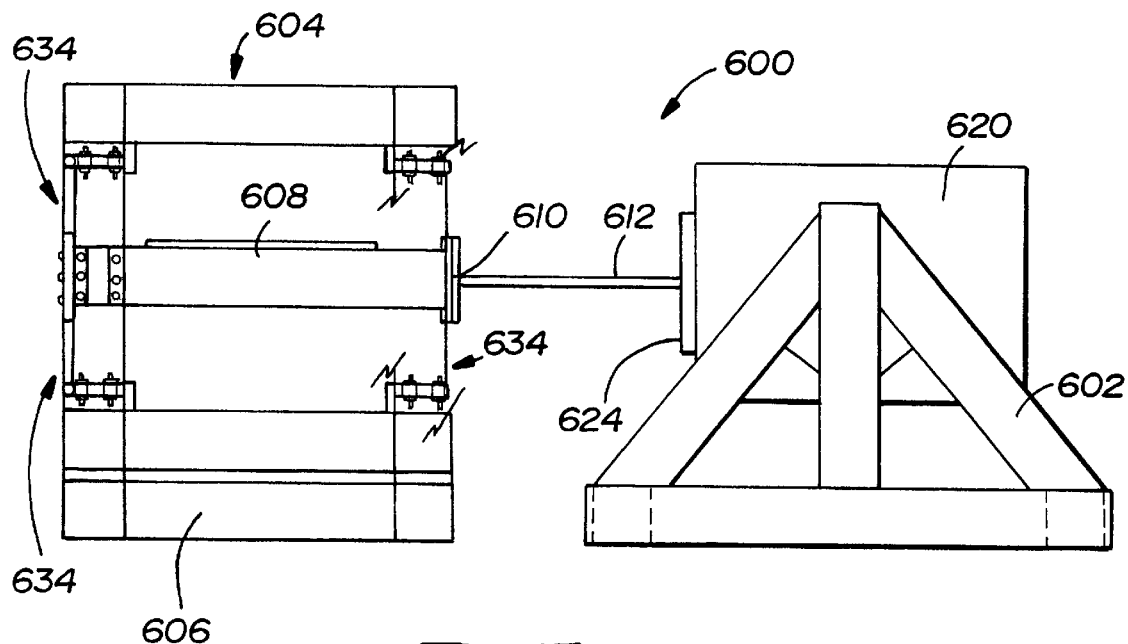
FIG. 15 diagrammatically illustrates another vibration test device.
Figure 16:
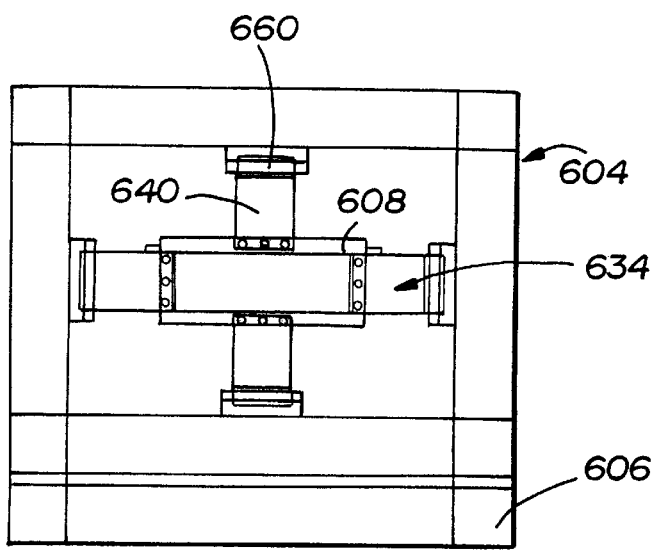
FIG. 16 is a side elevational view taken from the left of the embodiment of FIG. 15.

FIGS. 15 and 16 diagrammatically illustrate another embodiment of a vibration testing device 600. A base 602 supports a shaker device 620 so that the moving member 624 moves along a horizontal vibration axis (according to the drawing). A support structure 604 is mounted on a base 606. The support structure 604 supports a moving member 608. The moving member 608 is coupled with the moving member 624 by a connecting plate 610 and connecting rod 612, respectively. A plurality of flexure assemblies 634 support and guide the moving member 608 so that it moves along a horizontal vibration axis. In the illustrated embodiment (as best seen in FIG. 16) the moving member 608 is rectangular and preferably includes four flexure assemblies 634 at each end.

As can be appreciated from the preceding description, a flexure assembly designed according to this invention is useful for a variety of applications. Moreover, a flexure assembly designed according to this invention provides a frictionless, stable and noiseless support that allows a moving member to move along a vibration axis while preventing any off-axis motion when a suitable arrangement of flexure assemblies is provided.

The preceding description just gives example embodiments of this invention. For example, more than one flexure arm or more than two flexure leaves may be useful for some situations. The scope of legal protection given for this invention is to be limited only by the following claims, which encompass all fair legal equivalents allowed by law.

What is claimed is:

1. A vibration testing device comprising:
   a moving portion including a support surface that is adapted to support a test object and a longitudinal axis that extends along at least a portion of the moving portion;
   an exciter associated with the moving portion that generates a force that causes the moving portion to move along the longitudinal axis at a selected frequency; and
   a plurality of flexure supports that are connected to the moving portion to permit the moving portion to move along the longitudinal axis and to restrict the moving portion from moving in any other direction, each flexure support including
      a first flexure member having a body with first and second ends, the first end being rigidly connected to the moving portion and the second end being distal from the moving portion, the body being generally perpendicular to the moving portion longitudinal axis when the moving portion is in a first position,
      a second flexure member having a body with first and second ends, the second flexure member body being generally parallel to the longitudinal axis when the moving portion is in the first position,
      a third flexure member having a body with first and second ends, the third flexure member body being generally parallel to the longitudinal axis when the moving portion is in the first position,
      a first connector member rigidly connected to the first ends of each of the second and third flexure members to maintain the first ends in a selected alignment and spacing relative to each other, and
      a second connector member rigidly connected to the second ends of each of the second and third flexure members and the second end of the first flexure member to maintain the second ends of the second and third flexure members in a selected alignment and spacing relative to each other,
      wherein a central portion of the first flexure member body flexes and the first flexure member first and second ends remain generally perpendicular to the longitudinal axis to permit the moving portion to move along the longitudinal axis from the first position.

2. The device of claim 1, wherein a central portion of the second and third flexure member bodies, respectively, flex in unison and the respective first and second ends of the second and third flexure members remain generally parallel to the longitudinal axis to permit the moving portion to move along the longitudinal axis.

3. The device of claim 1, wherein the first flexure member comprises a generally planar and rectangular piece of material that is slightly flexible in one direction but stiff in at least two other directions that are each generally perpendicular to the one direction.

4. The device of claim 3, wherein the second and third flexure members, respectively, comprise a generally planar and rectangular piece of material that is slightly flexible in one direction but stiff in at least two other directions that are each generally perpendicular to the one direction.

5. The device of claim 4, wherein the flexure members are each made from stainless steel.

6. The device of claim 1, wherein the first flexure member comprises a plurality of layers of generally planar pieces of stiff material.

7. The device of claim 6, wherein the first flexure member comprises two pieces of stiff material that have second ends that are generally aligned with each other and the second connector member and wherein the first ends of the two pieces of material are spaced from each other.

8. The device of claim 7, wherein there are three flexure supports near a first end of the moving portion and three flexure supports near a second end of the moving portion.

9. The device of claim 7, including a clamping block member rigidly connected at the second ends of the first flexure members such that second ends of the first flexure members are positioned between the clamping block member and the second connector member and including a spacer member positioned between the second ends of the first flexure members.

10. The device of claim 1, wherein the first flexure member comprises a generally planar and generally rectangular flexure arm, the second and third flexure members each comprise a generally planar and generally rectangular flexure leaf and the first and second connector members each comprise a generally rectangular mounting block.

11. The device of claim 10, including a first clamp block positioned adjacent the second end of the first flexible member such that at least a portion of the flexure arm second end is fixed between the first clamp block and the second connector member.

12. The device of claim 11, including a second clamp block positioned adjacent the second end of each of the flexure leaves such that at least a portion of each flexure leaf second end is fixed between the second clamp block and the second mounting block and including a third clamp block positioned adjacent the first end of each of the flexure leaves such that at least a portion of each flexure leaf first end is fixed between the third clamp block and the first mounting block.

13. The device of claim 12, including a plurality of fasteners rigidly securing the clamp blocks, the respective flexure member ends and the respective mounting blocks to each other.

14. A flexure assembly that is adapted to be used to maintain a moving member in a vibration test device in a desired orientation during movement, comprising:

a flexure arm having a solid body that is at least partially flexible in a first direction and stiff in at least two other directions that are generally perpendicular to the first direction;

two flexure leaves each having a solid body that is at least partially flexible in a second direction and stiff in at least two other directions that are generally perpendicular to the second direction, each of the leaves having first and second ends;

a first rigid mounting block rigidly connected to the flexure leaves near the flexure leaves first ends to maintain the first ends in a desired spacing and alignment relative to each other; and a second rigid mounting block rigidly connected to the flexure leaves near the flexure leaves second ends and rigidly connected to one end of the flexure arm.

15. The assembly of claim 14, wherein the flexure arm and each of the flexure leaves, respectively, comprise a body that is generally planar and rectangular.

16. The assembly of claim 15, wherein the flexure arm and each of the flexure leaves, respectively, are made from stainless steel.

17. The assembly of claim 15, wherein the flexure arm comprises a plurality of layers of generally planar pieces of material.

18. The assembly of claim 17, wherein the flexure arm comprises two pieces of planar material that have second ends that are generally aligned with each other and the second mounting block and wherein the first ends of the two pieces of material are spaced from each other.

19. The assembly of claim 14, including a first clamp block positioned adjacent one end of the flexure arm such that at least a portion of the flexure arm one end is fixed between the first clamp block and the second mounting block.

20. The assembly of claim 19, including a second clamp block positioned adjacent the second end of each of the flexure leaves such that at least a portion of each flexure leaf second end is fixed between a respective one of the second clamp blocks and the second mounting block and including a third clamp block positioned adjacent the first end of each of the flexure leaves such that at least a portion of each flexure leaf first end is fixed between a respective one of the third clamp blocks and the first mounting block.

21. The assembly of claim 20, including a plurality of fasteners rigidly securing the clamp blocks, the respective flexure member ends and the respective mounting blocks to each other.

22. The assembly of claim 14, wherein the flexure arm has a length, a width and a thickness and wherein the thickness is substantially less than the width and the length, respectively.

23. The assembly of claim 22, wherein the length is substantially less than the width.

24. The assembly of claim 22, wherein the length is substantially greater than the width.

* * * * *